United States Patent [19]

Bailey

[11] 3,732,150
[45] May 8, 1973

[54] PROCESS FOR SEPARATING HALOGENATED HYDROCARBONS BY AZEOTROPIC DISTILLATION WITH AMMONIA

[75] Inventor: Grant C. Bailey, Bartlesville, Okla.

[73] Assignee: Phillips Petroleum Company, Bartlesville, Okla.

[22] Filed: Oct. 22, 1971

[21] Appl. No.: 191,904

[52] U.S. Cl. .................. 203/44, 203/50, 260/653
[51] Int. Cl. .................. C07c 19/08, B01d 3/36
[58] Field of Search .................. 203/50, 44, 42; 260/653

[56] References Cited

UNITED STATES PATENTS

| | | | |
|---|---|---|---|
| 2,831,902 | 4/1958 | Hamilton | 203/50 |
| 2,442,589 | 6/1948 | Evans et al. | 203/44 |
| 3,449,218 | 6/1969 | Jaeger | 203/44 |
| 2,999,885 | 9/1961 | Heberling | 260/653 |
| 3,004,075 | 10/1961 | Marcali | 260/653 |
| 2,909,576 | 10/1959 | Fenske et al. | 203/50 |
| 2,414,761 | 1/1947 | Nutting et al. | 203/44 |
| 2,738,371 | 3/1956 | Parmelee | 260/653 |

Primary Examiner—Wilbur L. Bascomb, Jr.
Attorney—Young and Quigg

[57] ABSTRACT

A process for separating pentafluoroethane from a first mixture of pentafluoroethane and 1,1,1-trifluoroethane and for separating tetrafluoroethane from a first mixture of tetrafluoroethane and 1,1-difluoroethane by adding ammonia to said first mixtures to form second mixtures having azeotropes and distilling the second mixtures in azeotropic distillation zones.

4 Claims, No Drawings

PROCESS FOR SEPARATING HALOGENATED HYDROCARBONS BY AZEOTROPIC DISTILLATION WITH AMMONIA

This invention relates to the separation of halogenated hydrocarbons from a first mixture and, more particularly, to a process for separating pentafluoroethane from a first mixture of 1,1,1-trifluoroethane and pentafluoroethane and for separating tetrafluoroethane from a first mixture of tetrafluoroethane and 1,1-difluoroethane.

In order to simplify the description of this process, pentafluoroethane is hereafter referred to as 125, 1,1,1-trifluoroethane is hereafter referred to as 143a, tetrafluoroethane is hereafter referred to as 134, and 1,1-difluoroethane is hereafter referred to as 152a.

In various hydrocarbon processes known in the art, mixtures of 125 and 143a or mixtures of 134 and 152a are formed. It sometimes then becomes advantageous to separate the halogenated hydrocarbons of the first mixtures for recovering the valuable constituents or for further processing. The process by which the first mixtures, i.e., 125 and 143a or 134 and 152a are formed is not a part of this application and it should be understood that the halogenated hydrocarbon separation process of this invention can be utilized without regard to the process by which the halogenated hydrocarbons are mixed to form the first mixture.

In their separate and pure state, the constituents of the first mixtures have boiling points at atmospheric pressure as follows:

| Constituent | Boiling Point, °C. |
|---|---|
| 125 | −48.5 |
| 143a | −47.6 |
| 134 | −19.7 |
| 152a | −24.7 |
| Ammonia | −33.4 |

The above boiling points indicate that it would be difficult if not impossible to separate 125 from 143a by ordinary distillation assuming the two components form an ideal system. Departure from ideality might make the separation by ordinary distillation easier or even more difficult. An attempt to separate 125 from 143a by distillation in a laboratory fractionation column produced little if any separation. It was also found to be impractical to separate 134 from 152a by ordinary distillation as a result of tests made in laboratory apparatus.

When it is impossible or very difficult to separate components by ordinary distillation, resort is made to more sophisticated separation methods. These include liquid-liquid extraction, crystallization, and adsorption. It is sometimes possible to make the separation in a distillation column in the presence of a volatility-modifying agent, i.e., an extraneous agent is added which forms non-ideal systems with the original components to be separated. If the extraneous agent forms an azeotrope, either minimum or maximum boiling, with one of the components but not with the other, then the azeotrope is frequently easily distilled from the other component and the process is called azeotropic distillation. If the extraneous agent does not form an azeotrope with either component but forms a more highly non-ideal system with one component than with the other, then separation is possible by distillation and the process is called extractive distillation.

It was found possible to separate 125 from 143a and also 134 from 152a by azeotropic distillation of each system using anhydrous ammonia as the azeotroping agent. With the 125–143a system it was found that ammonia formed an azeotrope with 143a with the azeotrope boiling at −50° to −52° C. at atmospheric pressure and with the azeotrope containing 11 weight percent ammonia. A minimum boiling azeotrope is thus formed since the azeotrope boiling point is below any of the components. In a distillation column the 143a–NH₃ azeotrope distills overhead and the 125 component is obtained as the kettle product. The 143a component may then be separated from the ammonia by several methods, for example by washing with water and concentrated sulfuric acid.

With the 134–152a system it was found that ammonia formed an azeotrope with 152a with the azeotrope boiling at −34° to −37° C. at atmospheric pressure and with the azeotrope containing 38 weight percent ammonia. This is also a minimum boiling azeotrope. In a distillation column the 152a–NH₃ azeotrope distilled overhead leaving 134 in the kettle. The 152a was also recovered from the azeotrope overhead by washing with water and concentrated sulfuric acid.

Separation of 125 from 143a by azeotropic distillation with ammonia was demonstrated in the laboratory using an Oldershaw distillation column containing 15 plates. The column was 2 inches in diameter, had a magnetic take-off head for regulation of reflux return to the column and overhead product take-off, was equipped with an overhead condenser, and had a 12-liter kettle equipped with electrical immersion heater. To the kettle on this column was charged 11.13 pounds of a mixture with a composition of 38.3 weight percent 143a and 61.7 weight percent 125 and also 8.5 pounds of anhydrous ammonia. Heat was applied to the kettle and the column operated at a reflux ratio of 10 to 1 (reflux to overhead product) while the following overhead product fractions were taken and analyzed:

TABLE I

Azeotropic Distillation of 125–143a with Ammonia

| Overhead Fraction No. | Range of column top temp. °C. | Wt. of overhead fraction, grams | Analysis of Overhead Fraction by Gas-Liquid Chromatography, wt. % | | |
|---|---|---|---|---|---|
| | | | NH₃ | 143a | 125 |
| 1 | −52.5/−51.5 | 454 | 13.0 | 87.0 | 0 |
| 2 | −51.9/−51.9 | 670 | 11.0 | 89.0 | 0 |
| 3 | −51.9/−51.7 | 551 | 11.9 | 88.1 | 0 |
| 4 | −51.9/−43.5 | 700 | 8.2 | 51.4 | 40.4 |
| 5 | −45.7/−43.3 | 781 | 4.9 | 7.2 | 87.9 |
| 6 | −45.0/−43.9 | 300 | 3.9 | 1.5 | 94.6 |
| Kettle Product Remaining − 12.23 lb. | | | | | |

Overhead fractions 1, 2, and 3 in above table clearly indicate that 143a can be separated from 125 by azeotropic distillation with ammonia. The kettle residue was washed with water and concentrated sulfuric acid for removal of ammonia and then analyzed to contain essentially pure 125, i.e., there was no detectable 143a in the kettle product.

Separation of 134 from 152a by azeotropic distillation with ammonia was also demonstrated using the same facilities described for the 125–143a-ammonia system. To the kettle on the column was charged 12.5 pounds of a mixture with a composition of 45.3 weight percent 152a, 54.7 weight percent 134. Anhydrous ammonia was also supplied in an amount of 7.5 pounds. Heat was applied to the kettle and the column operated at 3 to 1 reflux ratio while the following overhead product fractions were taken and analyzed:

TABLE II

Azeotropic Distillation of 134–152a With ammonia

| Overhead fraction No. | Range of column top temp. °C. | Wt. of overhead fraction, grams | Analysis of Overhead Fraction by Gas-liquid Chromatography, Wt. % | | |
|---|---|---|---|---|---|
| | | | NH$_3$ | 152a | 134 |
| 1 | −38.4/−37.6 | 2472 | 45 | 55 | 0 |
| 2 | −37.5/−36 | 1769 | 57 | 41 | 0 |
| 3 | −36/−33.3 | 998 | 70 | 20 | 10 |
| Kettle Product | | 3993 | 24 | 0 | 76 |

Inspection of the composition of overhead fractions 1 through 9 in Table II together with the kettle composition above illustrates the ease of separating 152a from 134 by azeotropic distillation with ammonia.

Other modifications and alterations of this invention will become apparent to those skilled in the art from the foregoing discussion and examples and it should be understood that this invention is not to be unduly limited thereto.

What is claimed is:

1. A process for separating pentafluoroethane from a first mixture of pentafluoroethane and 1,1,1-trifluoroethane comprising:
    adding ammonia to the first mixture for forming a resultant second mixture having an 1,1,1-trifluoroethane-ammonia azeotrope; and
    separating pentafluoroethane from the 1,1,1-trifluoroethane of the second mixture by distilling the second mixture in an azeotropic distillation zone to remove an overhead containing the 1,1,1-trifluoroethane-ammonia azeotrope.

2. A process, as set forth in claim 1, further including washing the separated 1,1,1-trifluoroethane and associated ammonia with water and sulfuric acid for removing the ammonia.

3. A process for separating tetrafluoroethane from a first mixture of tetrafluoroethane and 1,1,-difluoroethane, comprising:
    adding ammonia to the first mixture for forming a resultant second mixture having an 1,1-difluoroethane-ammonia azeotrope; and
    separating tetrafluoroethane from the 1,1-difluoroethane of the second mixture by distilling the second mixture in an azeotropic distillation zone to remove an overhead containing the 1,1-difluoroethane-ammonia.

4. A process, as set forth in claim 3, further including washing the separated 1,1-difluoroethane and associated ammonia with water and sulfuric acid for removing the ammonia.

* * * * *